(12) United States Patent
Spaete, Jr. et al.

(10) Patent No.: US 9,137,056 B1
(45) Date of Patent: Sep. 15, 2015

(54) ALGORITHMICALLY ADJUSTING THE NUMBER OF EQUALIZER TAPS IN AN UPSTREAM RECEIVER

(71) Applicant: ARRIS Enterprises, Inc., Suwanee, GA (US)

(72) Inventors: Lawrence C. Spaete, Jr., Naperville, IL (US); Ayham Al-banna, Orland Park, IL (US); Dmitriy Fridman, Naperville, IL (US); Carl L. Daun, Oak Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/247,472

(22) Filed: Apr. 8, 2014

(51) Int. Cl.
*H03H 7/30* (2006.01)
*H04L 25/03* (2006.01)

(52) U.S. Cl.
CPC .................. *H04L 25/03019* (2013.01)

(58) Field of Classification Search
CPC ............. H04L 25/03038; H04L 25/03057; H04L 2025/03617; H04L 2025/03477; H03H 21/0012

USPC ......................................................... 375/232
See application file for complete search history.

(56) References Cited

U.S. PATENT DOCUMENTS

| | | | |
|---|---|---|---|
| 5,909,384 A * | 6/1999 | Tal et al. ...................... 708/322 |
| 2001/0055319 A1 * | 12/2001 | Quigley et al. ............... 370/480 |
| 2002/0191684 A1 * | 12/2002 | Min et al. ..................... 375/222 |
| 2003/0177502 A1 * | 9/2003 | Kolze et al. .................. 725/111 |
| 2006/0088090 A1 * | 4/2006 | Azenkot et al. ............. 375/233 |
| 2008/0080607 A1 * | 4/2008 | Shah ............................ 375/232 |
| 2013/0051442 A1 * | 2/2013 | Cooper et al. ............... 375/222 |
| 2013/0251019 A1 * | 9/2013 | Kolze ........................... 375/232 |
| 2014/0029655 A1 * | 1/2014 | Thompson et al. .......... 375/224 |

* cited by examiner

*Primary Examiner* — Juan A Torres
(74) *Attorney, Agent, or Firm* — Bart A. Perkins (57) ABSTRACT

Methods, systems, and computer readable media can be operable to dynamically determine an optimal number of equalizer taps to be used at an upstream receiver based upon existing conditions on an upstream channel. Pre-equalizer coefficients associated with an upstream channel can be used to determine an optimal number of equalizer taps to be used at an upstream receiver. The number of equalizer taps can be dynamically determined for an individual customer premise equipment device or for a plurality of customer premise equipment devices using the same upstream channel.

15 Claims, 5 Drawing Sheets

ALGORITHMICALLY ADJUSTING THE NUMBER OF EQUALIZER TAPS IN AN UPSTREAM RECEIVER

TECHNICAL FIELD

This disclosure relates to dynamically determining the number of equalizer taps to be used in an upstream receiver.

BACKGROUND

The Data-Over-Cable Service Interface Specification (DOCSIS) was established by cable television network operators to facilitate transporting data traffic, primarily Internet traffic, over existing cable television (CATV) networks. In addition to transporting data traffic, as well as television content signals over a CATV network, multiple services operators (MSO) also use their CATV network infrastructure for carrying voice, video on demand (VoD) and video conferencing traffic signals, among other services.

In an upstream receiver, such as is used in a cable modem termination system (CMTS), an increase in the number of taps used in an adaptive equalizer can result in an improved modulation error ratio (MER), and thus, reduced forward error correction (FEC) errors, when there are significant upstream channel impairments (e.g., frequency roll-off, channel micro-reflections, etc.). However, the use of additional taps can negatively impact the noise margin on the upstream channel when there are no upstream impairments and can reduce the number of available hardware resources used to filter signals (e.g., multipliers and delay taps). Current upstream CMTS receivers use a global register setting that is set by software for all types of upstream channel conditions. Typically, the register setting is set for worst case upstream conditions. Therefore, when the upstream channel is relatively clean, filtering resources are likely being used unnecessarily and noise margins are likely being lost. It is desirable to improve upon the techniques for determining a number of equalizer taps to be used in an upstream receiver.

BRIEF DESCRIPTION OF THE DRAWINGS

Like reference numbers and designations in the various drawings indicate like elements.

DETAILED DESCRIPTION

In embodiments, methods and systems can be operable to facilitate dynamically determining an optimal number of equalizer taps to be used in an upstream receiver based upon existing conditions on an upstream channel. In embodiments, existing conditions on an upstream channel can be determined based on energy in one or more equalizer taps associated with an upstream receiver. For example, energy in one or more equalizer taps can be determined from equalization coefficients (e.g., pre-equalization coefficients generated according to DOCSIS specifications) associated with one or more devices (e.g., cable modem).

In embodiments, equalization coefficients are coefficients used in a post-equalizer in a CMTS and pre-equalization coefficients are used in a cable modem to pre-distort a signal in preparation for propagation through a channel so that the pre-distorted signal can be received flat at the CMTS.

In embodiments, for initial transmissions, equalization coefficients are determined via the post-equalizer in the CMTS and are sent to the cable modem to be used as pre-equalization coefficients. In embodiments, for data transmissions following an initial transmission, the CMTS uses the post-equalizer to remove any leftover distortion that might exist in the signal. In embodiments, for station maintenance signals, the CMTS uses the post equalizer to remove any leftover distortion in the signal and the CMTS sends resulting post-equalizer coefficients (e.g., coefficients resulting from the post-equalization process) to the cable modem to reload or update the cable modem's pre-equalization coefficients via the process of convolution between the new and existing coefficients.

In embodiments, pre-equalizer coefficients associated with one or more devices can be used as the basis for determining a number of equalizer taps to be used in an upstream receiver. It should be understood that various methods can be used in basing a number of equalizer taps on pre-equalizer coefficients, and the methods provided in this disclosure are not meant to limit the scope of this invention, but are rather meant to provide examples of the invention.

Figure 1:
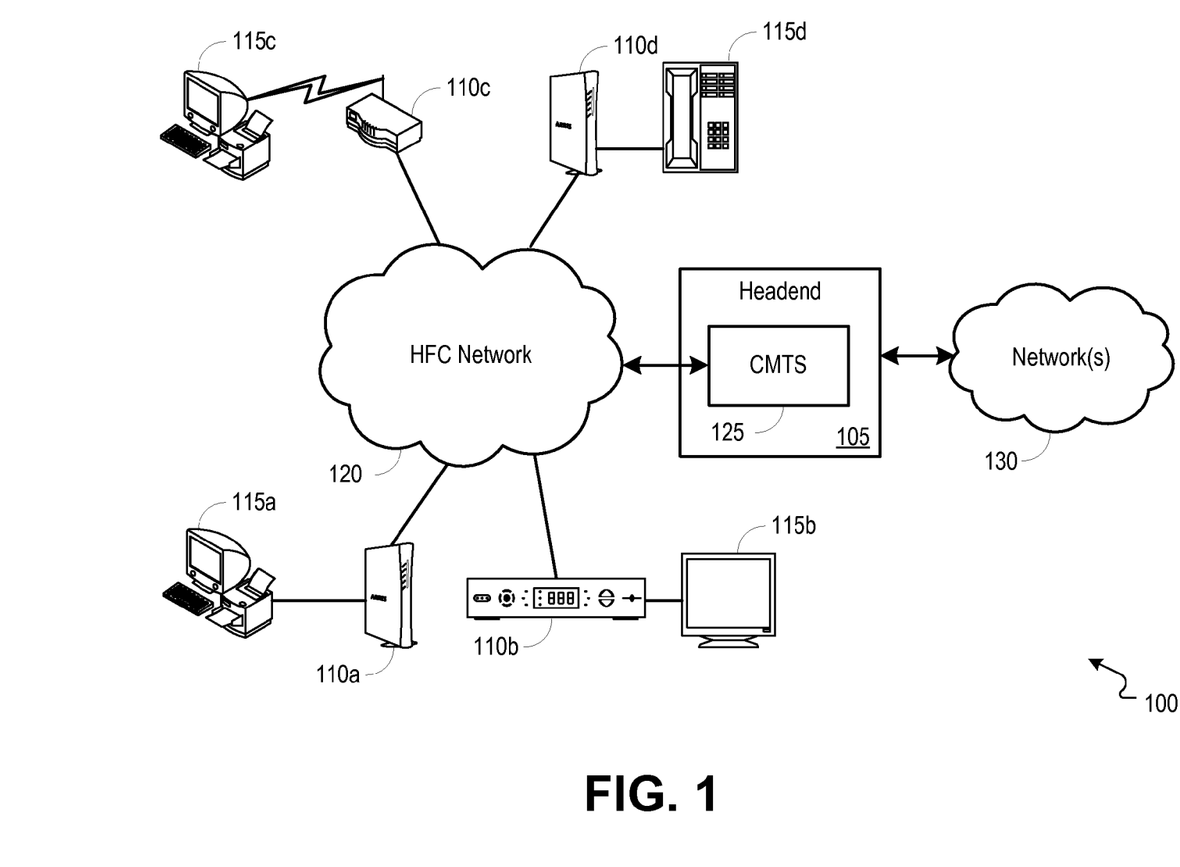
FIG. 1 is a block diagram illustrating an example network environment operable to dynamically determine an optimal number of equalizer taps to be used based upon existing conditions on an upstream channel.

FIG. 1 is a block diagram illustrating an example network environment 100 operable to dynamically determine an optimal number of equalizer taps to be used based upon existing conditions on an upstream channel. In embodiments, a headend 105 can provide video service(s) and/or data service(s) to customer premise equipment (CPE) devices 110a-d in one or more subscriber groups (e.g., service group(s)). The CPE devices can include, for example, a cable modem 110a, a set-top box 110b, a wireless router including an embedded cable modem 110c, or a media terminal adapter (MTA) 110d, among many others (e.g., digital subscriber line (DSL) modem, voice over internet protocol (VOIP) terminal adapter, video game console, digital versatile disc (DVD) player, communications device, etc.). A cable modem or embedded MTA (eMTA) 110a can facilitate communications from the headend 105 to a computer 115a. A set-top box 110b can facilitate communications from the headend 105 to a television 115b or a digital video recorder (DVR). A wireless router 110c can facilitate wireless communications between a computer 115c and a headend 105. An MTA 110d can facilitate communications between a telephone 115d and a headend 105.

The CPE devices 110a-d can communicate with the headend 105 via a hybrid fiber-coax (HFC) network 120. The headend 105 can facilitate communications between one or more network(s) 130 and the CPE devices 110a-d. In embodiments, the network(s) 130 can include one or more networks internal to the headend and/or one or more networks external to the headend (e.g., one or more extranets, the Internet, etc.). The network(s) 130, for example, can operate using internet protocol (IP), sending data packets to and receiving data packets from the headend 105. In further examples, one or more video sources may provide streaming data through the network(s) 130 to the headend 105.

In embodiments, the CMTS 125 can separate video content into various streams or channels to be transmitted (e.g., broadcast, multicast, unicast, etc.) to the CPE devices 110*a-d*. For example, each of the various streams or channels can represent a specific bandwidth at a frequency associated with a specific content provider and/or network. In embodiments, the CMTS 125 can designate one or more channels for upstream traffic (e.g., signal(s) sent from a CPE device 110*a-d* to the CMTS 125).

In embodiments, traffic on an upstream channel can be degraded by upstream impairments existing on the upstream channel. During a ranging process between a CPE device 110*a-d* and CMTS 125, and during subsequent communications between the CPE device and CMTS, the CMTS can assign one or more pre-equalization coefficients to the CPE device. For example, the pre-equalization coefficients can be based on the extent of upstream impairments existing on an associated upstream channel. In embodiments, pre-equalization coefficients can be associated with an equalizer tap in an upstream receiver. For example, a pre-equalizer coefficient can be associated with the main equalizer tap of an upstream receiver and other pre-equalizer coefficients can be associated with the plurality of non-main equalizer taps of the upstream receiver. In embodiments, the CPE device 110*a-d* can use the one or more pre-equalization coefficients to pre-distort an upstream signal so that the upstream signal is corrected by the upstream impairments and arrives at the CMTS 125 free of distortion.

Figure 2:
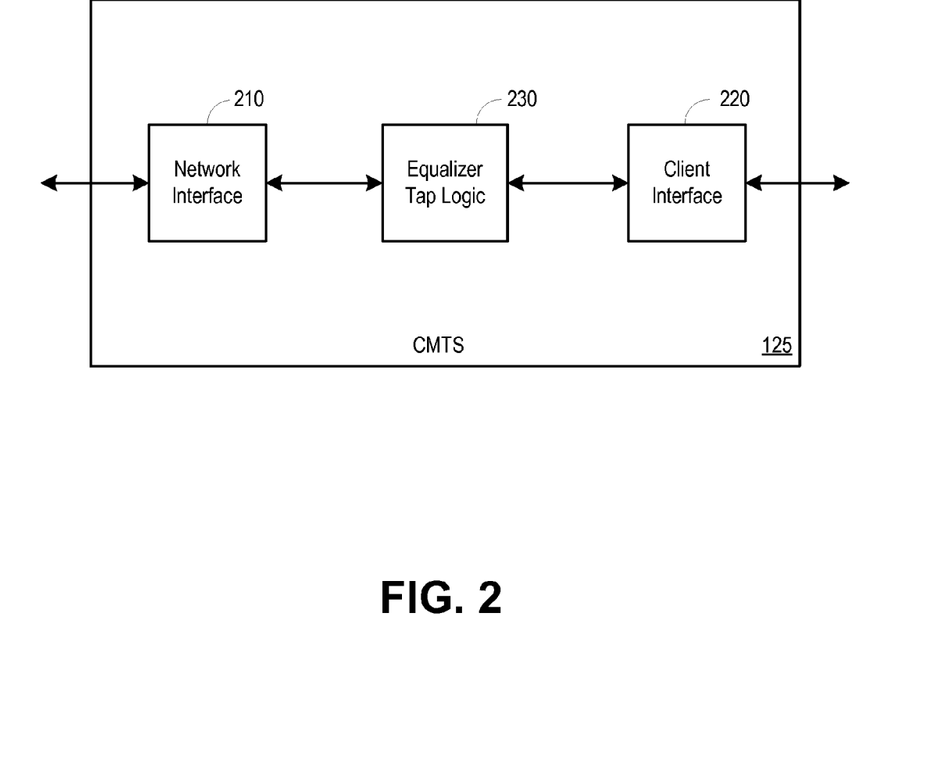
FIG. 2 is a block diagram illustrating an example CMTS operable to dynamically determine an optimal number of equalizer taps to be used based upon existing conditions on an upstream channel.

FIG. 2 is a block diagram illustrating an example CMTS operable to dynamically determine an optimal number of equalizer taps to be used based upon existing conditions on an upstream channel. The CMTS 125 can include a network interface 210, a client interface 220, and equalizer tap logic 230. In embodiments, the network interface 210 can be an Ethernet interface and can be used to provide an interface to one or more networks (e.g., network(s) 130 of FIG. 1). In embodiments, the client interface 220 can be a radio frequency interface (e.g., coaxial cable) and can be used to provide an interface to a HFC network (e.g., HFC network 120 of FIG. 1). It should be understood that in various implementations, the client interface 220 can be a generic network interface to a local area network (LAN), wide area network (WAN), or other applicable network. In embodiments, the client interface 220 can be used to provide an interface to one or more CPE devices (e.g., CPE devices 110*a-d*).

In embodiments, equalizer tap logic 230 can be operable to identify pre-equalization coefficients associated with one or more upstream signal sources (e.g. CPE device 110*a-d*), and to determine a number of equalizer taps to be used in an upstream receiver based on the identified pre-equalization coefficients. For example, based on a ratio between a pre-equalization coefficient associated with a main tap and pre-equalization coefficients associated with one or more non-main taps, equalizer tap logic 230 can make a determination as to the effectiveness of pre-equalization coefficients and equalizer taps within the associated upstream channel. Based on the effectiveness of pre-equalization coefficients and equalizer taps, equalizer tap logic 230 can make a determination as to the number of equalizer taps to be used in the upstream receiver associated with the equalizer taps.

Figure 3:
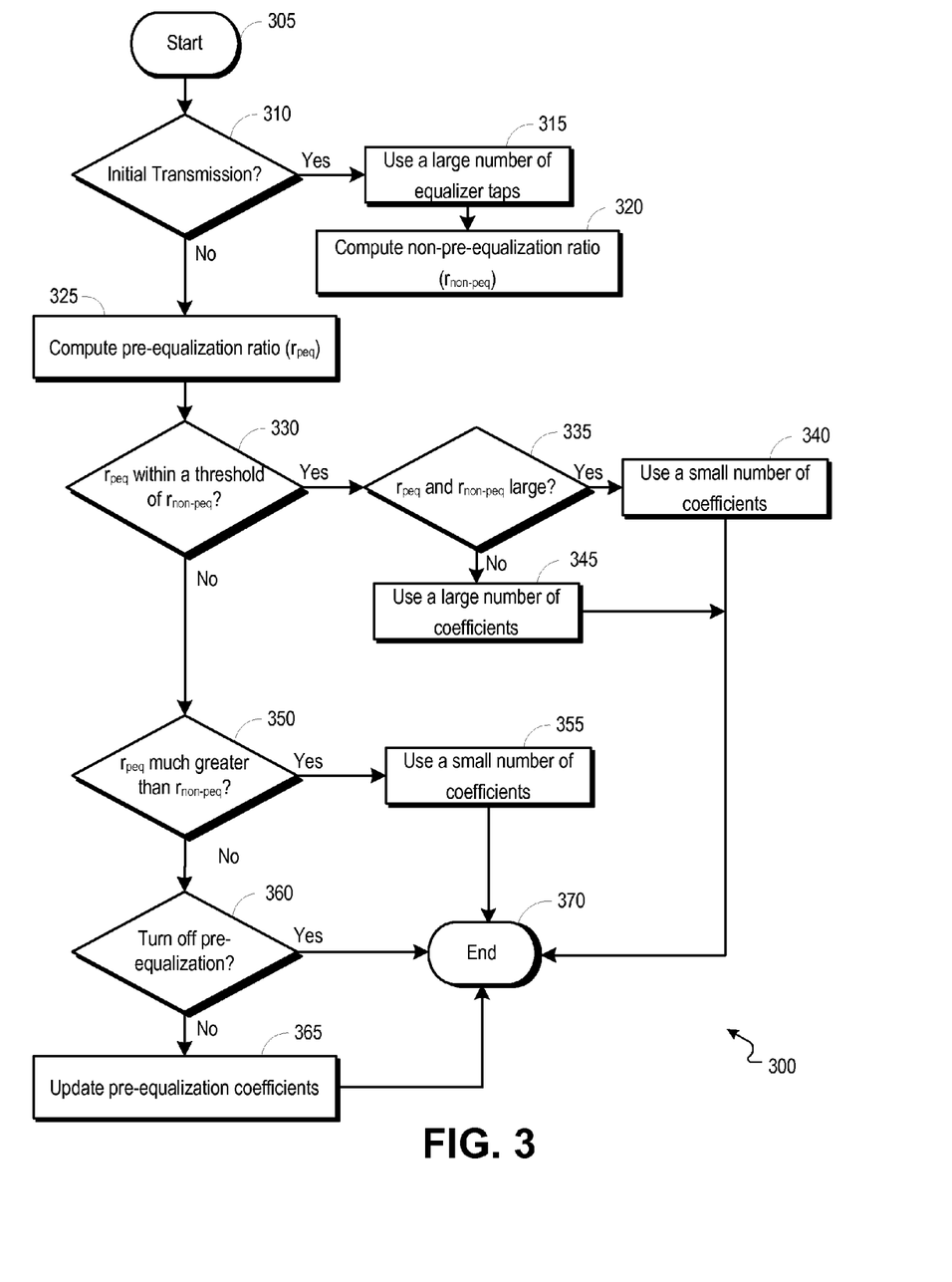
FIG. 3 is a flowchart illustrating an example process operable to dynamically determine an optimal number of equalizer taps to be used based upon comparisons between pre-equalized and non-pre-equalized signals.

FIG. 3 is a flowchart illustrating an example process 300 operable to dynamically determine an optimal number of equalizer taps to be used based upon comparisons between pre-equalized and non-pre-equalized signals.

TABLE 1

| Pre-equalization Ratio | Non-Pre-Equalization Ratio | Condition | Action |
| --- | --- | --- | --- |
| Large | Large | Clean Plant | Use Small Number of Equalizer Taps |
| Large | Small | Pre-Equalization Handling Impairments | Use Small Number of Equalizer Taps |
| Small | Large | Non-Optimal Pre-Equalization Coefficients | Reset Pre-Equalization Coefficients and/or Disable Pre-Equalization |
| Small | Small | Pre-Equalization Not Handling Impairments | Use Large Number of Equalizer Taps |

TABLE 1 shows the conditions and actions that are described by the process 300. A large pre-equalization ratio coupled with a large non-pre-equalization ratio can suggest that a plant is clean and that a small number of equalizer taps can be used. A large pre-equalization ratio coupled with a small non-pre-equalization ratio can suggest that pre-equalization is handling impairments and that a small number of equalizer taps can be used. A small pre-equalization ratio coupled with a large non-pre-equalization ratio can suggest that less than optimal pre-equalization coefficients are being used and the pre-equalization coefficients can be reset and/or pre-equalization can be disabled. A small pre-equalization ratio coupled with a small non-pre-equalization ratio can suggest that pre-equalization is not handling impairments and that a large number of equalizer taps can be used.

The process 300 can begin at 305, when a determination is made to optimize the number of equalizer taps used in association with a plurality of modems. It should be understood that the process 300 can be operable to dynamically determine an optimal number of equalizer taps to be used on a per channel or per cable modem basis.

At 310, a determination can be made whether a received signal (e.g., a signal received by a CMTS from a cable modem) is an initial transmission from a CPE device (e.g., an initial maintenance request, a first station maintenance request, etc.). A determination whether the received signal is an initial transmission can be made, for example, by logic within a CMTS (e.g., equalizer tap logic 230 of FIG. 2). For example, equalizer tap logic 230 can determine whether the associated CMTS has received a signal from the CPE device based upon information and/or data contained in received packets (e.g., CPE device identification data, signal type identification information, etc.).

If, at 310, the determination is made that the received signal is an initial transmission, the process 300 can proceed to 315. At 315, a large number of equalizer taps can be used to remedy degradations in signals received from the CPE device. For example, in some implementations, where the received signal is an initial transmission, all equalizer taps available for use within an associated upstream receiver can be used to remedy degradations in signals received from the CPE device. Initial signal transmissions from a CPE device are not subjected to pre-equalization because an associated CMTS has not been provided with the opportunity to assign pre-equalization coefficients to the CPE device. Therefore, a large number of equalizer taps can be used to remedy degradations in signals transmitted from the CPE device that result from impairments existing in the upstream channel until the effectiveness of pre-equalization by the CPE device can be determined.

At 320, a non-pre-equalization ratio ($r_{non-peq}$) associated with one or more signals that are not pre-equalized (e.g., initial signals transmitted from a CPE device to a CMTS, ranging requests, etc.) can be computed. A non-pre-equalization ratio associated with one or more signals that are not pre-equalized can be computed, for example, by logic within a CMTS (e.g., equalizer tap logic 230 of FIG. 2). For example, the non-pre-equalization ratio can be equivalent to the amount of energy in a main equalizer tap over the amount of energy in other non-main equalizer taps associated with the main equalizer tap. The energy in the main equalizer tap can be obtained using the real component, the imaginary component, or a combination of the real and imaginary components. In embodiments, the non-pre-equalization ratio can be based on equalization coefficients associated with a plurality of CPE devices (e.g., CPE devices 110*a-d*). In embodiments, the non-pre-equalization ratio can be computed by dividing one or more devices' (e.g., devices from which a non-pre-equalized signal is transmitted) equalization coefficient (e.g., equalization coefficient used at a CMTS) associated with a main equalizer tap by the one or more devices' equalization coefficients associated with one or more non-main equalizer taps. In embodiments, the ratio can be computed by averaging the ratios of one or more individual devices. In embodiments, a non-pre-equalization ratio can be computed for signals associated with a single CPE device or a plurality of CPE devices on an upstream channel that have not been pre-equalized (e.g., first station maintenance request).

Returning to 310, if the determination is made that the received signal is not an initial transmission, the process 300 can proceed to 325. As a non-initial transmission, the received signal will include pre-equalization coefficients from which a pre-equalization ratio can be computed. At 325, a pre-equalization ratio associated with signals that are pre-equalized (e.g., signals other than first communications between a CPE device and CMTS) can be computed. A pre-equalization ratio associated with signals that are pre-equalized can be computed, for example, by logic within a CMTS (e.g., equalizer tap logic 230 of FIG. 2). In embodiments, the pre-equalization ratio can be computed by dividing one or more devices' (e.g., devices from which a pre-equalized signal is transmitted) pre-equalization coefficient associated with a main pre-equalizer tap by the one or more devices' pre-equalization coefficients associated with one or more non-main pre-equalizer taps. In embodiments, a pre-equalization ratio can be computed for signals associated with a single CPE device or a plurality of CPE devices on an upstream channel that have been pre-equalized (e.g., station maintenance requests other than a first station maintenance request). In embodiments, pre-equalization coefficients can be identified from data or information within the signal received from the CPE device.

At 330, a determination is made whether the pre-equalization ratio and non-pre-equalization ratio are comparable. The determination whether the pre-equalization ratio and non-pre-equalization ratio are comparable can be made, for example, by logic within a CMTS (e.g., equalizer tap logic 230 of FIG. 2). In embodiments, the difference between the pre-equalization ratio and non-pre-equalization ratio can be compared to a threshold value. If the difference between the pre-equalization ratio and non-pre-equalization ratio is less than the threshold value, the process 300 can proceed to 335.

At 335, a determination is made whether the pre-equalization ratio and non-pre-equalization ratio are large values. For example, the pre-equalization ratio and/or non-pre-equalization ratio can be considered a large value if the ratio is greater than a predetermined threshold. A large pre-equalization ratio and/or non-pre-equalization ratio can indicate that pre-equalization of the associated signal is improving the quality of the signal when it reaches a CMTS. A pre-equalization ratio that is not large, coupled with a non-pre-equalization ratio that is not large, can indicate that pre-equalization of signals originating from an associated CPE device is not being carried out or is not sufficiently counteracting all of the impairments in the associated upstream channel. The determination whether the pre-equalization ratio and/or non-pre-equalization ratio are large values can be made, for example, by logic within a CMTS (e.g., equalizer tap logic 230 of FIG. 2). In embodiments, the determination whether the ratio is large can be based upon a comparison between the ratio and a predetermined threshold value. For example, where either the pre-equalization or non-pre-equalization ratio is equal to or greater than a predetermined threshold value, it can be determined that the ratio is large. In embodiments, where the pre-equalization ratio and the non-pre-equalization ratio is less than a predetermined threshold value, a determination can be made that pre-equalization of the associated signal is not counteracting every upstream impairment in the associated channel.

If, at 335, the determination is made that the pre-equalization and the non-pre-equalization ratios are large values, the process 300 can proceed to 340. At 340, a small number of coefficients can be used to remedy quality deficiencies of the associated signal resulting from upstream impairments. For example, the number of coefficients used can be a small number within the range of the number of equalizer taps available for use in an upstream receiver. In embodiments, a large pre-equalization ratio coupled with a large non-pre-equalization ratio can indicate a low level of upstream impairments in the upstream channel being monitored, and a small number of coefficients can be sufficient to remedy degradations of a signal that result from a low level of impairments. A relatively large first ratio can indicate that there are few or no upstream impairments in the upstream channel through which the associated signal was received.

Returning to 335, if the determination is made that the pre-equalization and the non-pre-equalization ratio are not large, the process 300 can proceed to 345. At 345, a large number of coefficients can be used to remedy quality deficiencies of the associated signal resulting from upstream impairments. For example, the number of coefficients used can be a large number within the range of the number of equalizer taps available for use in an upstream receiver. In embodiments, a pre-equalization ratio that is not large in combination with a non-pre-equalization ratio that is not large can indicate the presence of signal quality deficiencies resulting from upstream impairments, thus implying that the pre-equalization conducted at an associated CPE device is insufficient to cancel out the upstream impairments in the associated upstream channel, and, therefore, a large number of coefficients can be used to remedy degradations of the associated signal that result from impairments existing in the upstream channel.

Returning to 330, if the difference between the pre-equalization ratio and non-pre-equalization ratio is greater than the threshold value, the process 300 can proceed to 350. At 350, a determination is made whether the pre-equalization ratio is significantly greater than the non-pre-equalization ratio. The determination whether the pre-equalization ratio is significantly greater than the non-pre-equalization ratio can be made, for example, by logic within a CMTS (e.g., equalizer tap logic 230 of FIG. 2). In embodiments, the difference between the pre-equalization ratio and non-pre-equalization ratio can be compared to a threshold value. For example, if the difference between the pre-equalization ratio and non-preequalization ratio is greater than the threshold value, the process 300 can proceed to 355.

At 355, a small number of coefficients can be used to remedy quality deficiencies of the associated signal resulting from upstream impairments. For example, the number of equalizer taps used can be a small number within the range of the number of equalizer taps available for use in an upstream receiver. In embodiments, a pre-equalization ratio that is significantly greater than a non-pre-equalization ratio can indicate that pre-equalization is counteracting some upstream impairments on the upstream channel, and, because pre-equalization is improving the quality of the associated signal, a small number of coefficients can be sufficient to remedy degradations of the associated signal that result from impairments existing in the upstream channel.

Returning to 350, if the difference between the pre-equalization ratio and non-pre-equalization ratio is not greater than the threshold value, the process 300 can proceed to 360. At 360, a determination is made whether to temporarily stop pre-equalization of signals transmitted from a CPE device to a CMTS. For example, the determination whether to temporarily stop pre-equalization can be made based on various criteria and/or factors (e.g., the values of the pre-equalization ratio and non-pre-equalization ratio, the difference between the pre-equalization ratio and non-pre-equalization ratio, and others). In embodiments, the determination to temporarily stop pre-equalization can be made when pre-equalization of signals transmitted from a CPE device to a CMTS is negatively affecting the signal.

If the determination is made to not temporarily stop pre-equalization of signals transmitted from a CPE device to a CMTS, the process 300 can proceed to 365. At 365, pre-equalization coefficients associated with the CPE device can be updated based upon the pre-equalization and non-pre-equalization ratios. For example, where the pre-equalization ratio and non-pre-equalization ratio are small (e.g., below a threshold value), the number of pre-equalization coefficients associated with a CPE device can be increased. In embodiments, a CMTS can send the updated number of pre-equalization coefficients to a CPE device.

Returning to 360, if the determination is made to temporarily stop pre-equalization, the process 300 can end at 370.

Figure 4:
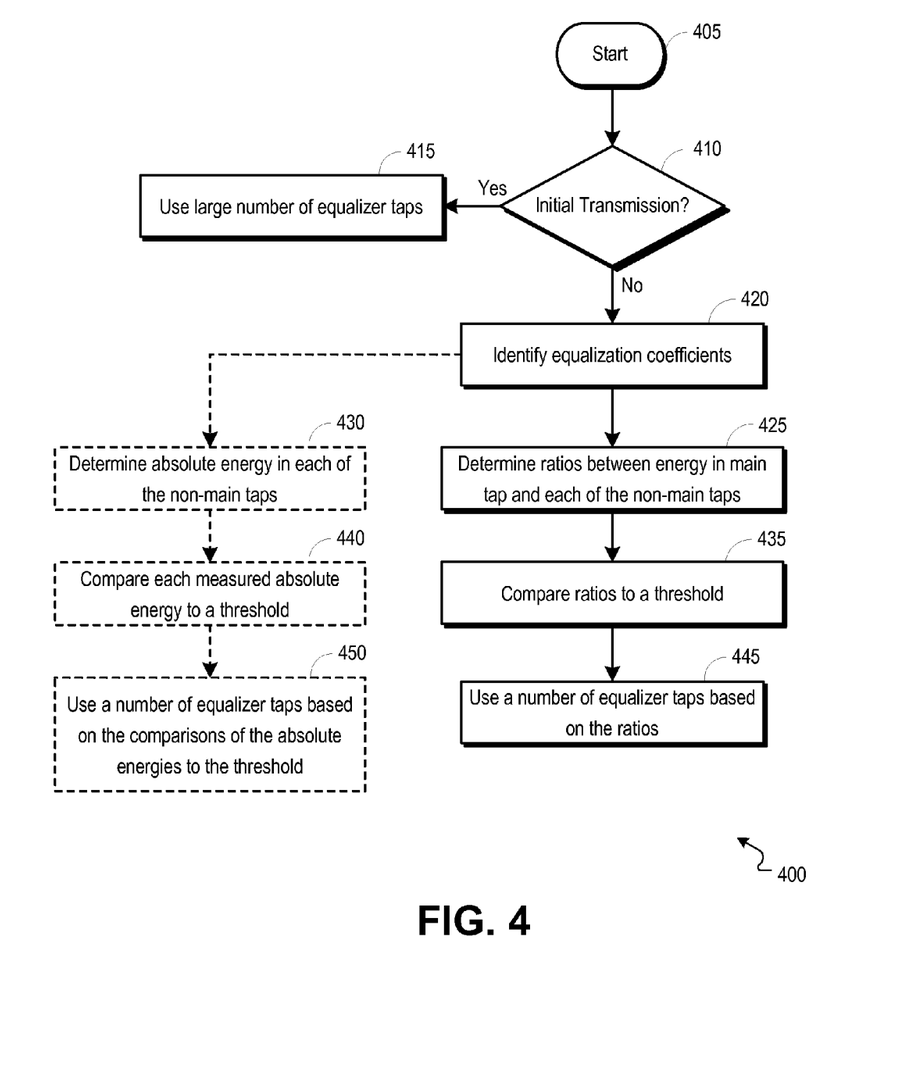
FIG. 4 is a flowchart illustrating an example process operable to dynamically determine an optimal number of equalizer taps to be used based upon existing conditions on an upstream channel.

FIG. 4 is a flowchart illustrating an example process 400 operable to dynamically determine an optimal number of equalizer taps to be used based upon existing conditions on an upstream channel. The process 400 can begin at 405, when a signal is received from a CPE device (e.g., a maintenance burst is received from a CPE device 110*a-d*).

At 410, a determination can be made whether the received signal is an initial transmission from the CPE device (e.g., an initial maintenance request, a first station maintenance request, etc.). A determination whether the received signal is an initial transmission can be made, for example, by logic within a CMTS (e.g., equalizer tap logic 230 of FIG. 2). For example, equalizer tap logic 230 can determine whether the associated CMTS has received a signal from the CPE device based upon information and/or data contained in received packets (e.g., CPE device identification data, signal type identification information, etc.).

If, at 410, the determination is made that the received signal is an initial transmission, the process 400 can proceed to 415. At 415, a large number of equalizer taps can be used to remedy degradations in signals received from the CPE device. For example, in some implementations, where the received signal is an initial transmission, all equalizer taps available for use within an associated upstream receiver can be used to remedy degradations in signals received from the CPE device. Initial signal transmissions from a CPE device are not subjected to pre-equalization because an associated CMTS has not been provided with the opportunity to assign pre-equalization coefficients to the CPE device. Therefore, a large number of equalizer taps can be used to remedy degradations in signals transmitted from the CPE device that result from impairments existing in the upstream channel until the effectiveness of pre-equalization by the CPE device can be determined.

Returning to 410, if the determination is made that the received signal is not an initial transmission, the process 400 can proceed to 420. At 420, equalization coefficients associated with the CPE device from which the signal was transmitted can be identified. Equalization coefficients can be identified, for example, by logic within a CMTS (e.g., equalizer tap logic 230 of FIG. 2). In embodiments, equalization coefficients can be identified from data or information within the signal received from the CPE device.

At 425, ratios between energy in the main equalizer tap and energy in the one or more non-main equalizer taps of the associated upstream receiver can be determined. For example, each ratio can be equivalent to the amount of energy in a main equalizer tap over the amount of energy in another non-main equalizer tap associated with the main equalizer tap. A ratio between energy in the main equalizer tap and energy in the non-main equalizer taps can be determined, for example, by logic within a CMTS (e.g., equalizer tap logic 230 of FIG. 2). In embodiments, the ratios can be computed based on the identified pre-equalization coefficients associated with the CPE device from which the signal was received. In embodiments, the ratios can be computed by dividing a pre-equalization coefficient associated with a main pre-equalizer tap by one or more pre-equalization coefficients associated with one or more non-main pre-equalizer taps.

In addition to, or as an alternative to 425, at 430, the absolute energy in each of the non-main equalizer taps can be determined. The absolute energy in each of the non-main equalizer taps can be determined, for example, by logic within a CMTS (e.g., equalizer tap logic 230 of FIG. 2). In embodiments, equalizer tap logic can make a determination whether, and to what extent, absolute energy is present in each of the non-main equalizer taps.

At 435, the ratios between energy in the main equalizer tap and energy in the non-main equalizer taps can be compared to a predetermined threshold. A comparison between the ratios and a predetermined threshold can be made, for example, by logic within a CMTS (e.g., equalizer tap logic 230 of FIG. 2). For example, the predetermined threshold can be reflective of a measurement of energy in the main pre-equalizer tap being significantly greater than one or more measurements of energy in the one or more non-main pre-equalizer taps.

In addition to, or as an alternative to 435, at 440, the absolute energy in each of the non-main equalizer taps can be compared to a predetermined threshold. A comparison between the absolute energy in each of the non-main equalizer taps and a predetermined threshold can be made, for example, by logic within a CMTS (e.g., equalizer tap logic 230 of FIG. 2). In embodiments, the predetermined threshold can be equivalent to a level of energy that indicates the use of the associated non-main equalizer tap. For example, the absolute energy in a non-main equalizer tap being greater than the predetermined threshold can indicate that use of the non-main equalizer tap will help to remedy degradations in the associated signal.

At 445, a number of equalizer taps can be used based upon the comparison of the ratios between energy in the main equalizer tap and energy in the non-main equalizer taps to the predetermined threshold. For example, if a ratio is greater than or equal to the predetermined threshold, the status (e.g., dormant or active) of the non-main equalizer tap associated with the ratio can be maintained. As another example, if a ratio is less than the predetermined threshold, the non-main equalizer tap associated with the ratio can be used to remedy signal degradations. In embodiments, a measurement of energy in the main equalizer tap that is significantly greater than one or more measurements of energy in one or more non-main equalizer taps can indicate that existing pre-equalization coefficients and equalizer taps in the associated upstream receiver are effectively remedying degradations in signals transmitted from the CPE device that result from impairments existing in the upstream channel, and, therefore, that the current number of equalizer taps used in the upstream receiver should be maintained. In embodiments, the number of equalizer taps used can be based upon the type of signal that is received (e.g., different numbers of equalizer taps can be used for station maintenance bursts versus data bursts).

In addition to, or as an alternative to 445, at 450, a number of equalizer taps can be used based upon the comparisons between the absolute energy measured at each non-main equalizer tap and the predetermined threshold. For example, if the absolute energy measured at a non-main equalizer tap is greater than or equal to the predetermined threshold, the non-main equalizer tap can be used to remedy signal degradations. In embodiments, logic within a CMTS (e.g., equalizer tap logic 230 of FIG. 2) can identify the last non-main equalizer tap (e.g., non-main equalizer taps can exist in a numerically ordered series of equalizer taps) in which the measured absolute energy is greater than or equal to the predetermined threshold, and the identified non-main equalizer tap, as well as the non-main equalizer taps preceding the identified non-main equalizer tap, can be used to remedy signal degradations. In embodiments, a predetermined number of non-main equalizer taps (e.g., an equalizer tap buffer) following the identified non-main equalizer tap, in addition to the identified non-main equalizer tap and the non-main equalizer taps preceding the identified non-main equalizer tap, can be used to remedy degradations in signals received from a CPE device. For example, the equalizer tap buffer can be based upon an estimation of future signal degradation.

Figure 5:
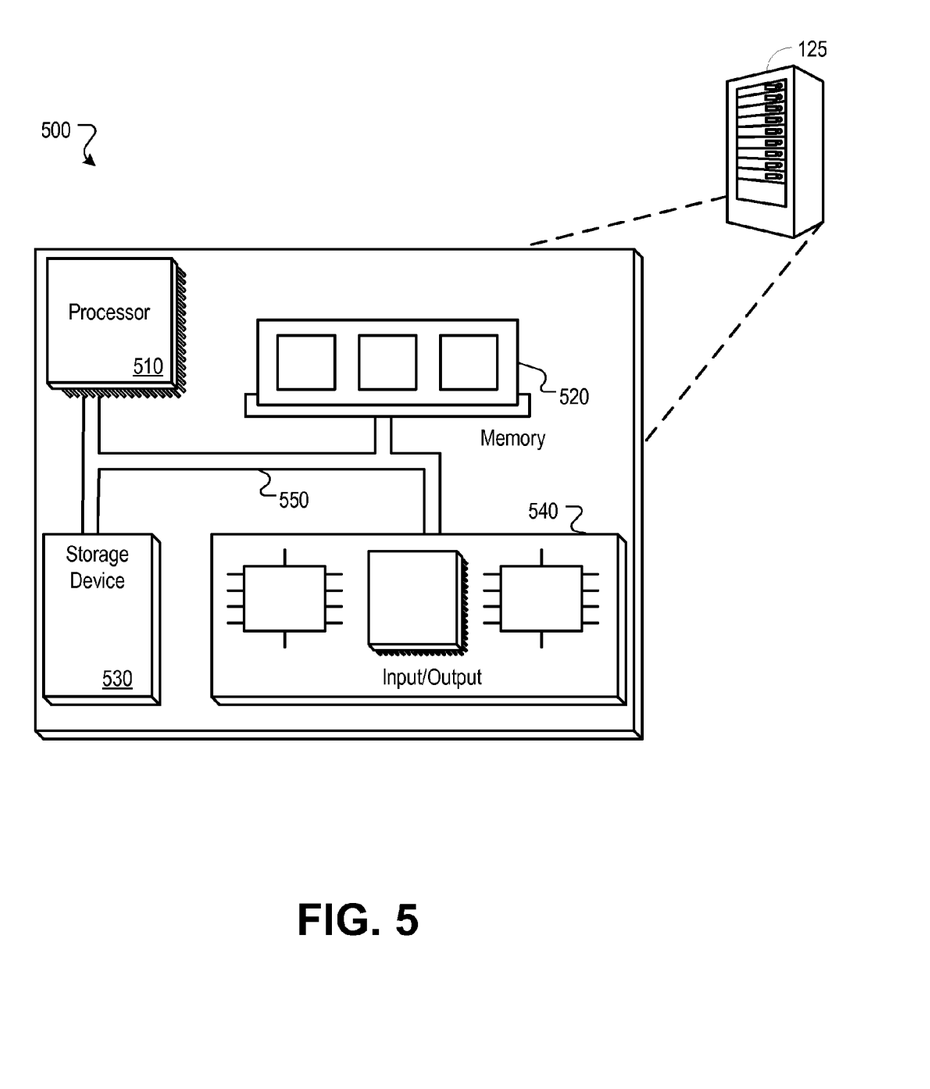
FIG. 5 is a block diagram of a hardware configuration operable to dynamically determine an optimal number of equalizer taps to be used based upon existing conditions on an upstream channel.

FIG. 5 is a block diagram of a hardware configuration 500 operable to dynamically determine an optimal number of equalizer taps to be used based upon existing conditions on an upstream channel. While a CMTS 125 is shown, it should be understood that other kinds of devices can operate to determine impulse noise over a wide spectrum based upon measurements of impulse noise associated with each of a plurality of channels. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., HFC Network 120 of FIG. 1, network(s) 130 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A computer-implemented method, comprising:
   receiving a non-pre-equalized signal at an upstream receiver;
   identifying equalization coefficients associated with the non-pre-equalized signal;
   determining the extent of upstream channel impairments encountered by the non-pre-equalized signal based upon the identified equalization coefficients;
   determining a number of equalizer taps to be used at the upstream receiver, wherein the number of equalizer taps is based upon the extent of upstream channel impairments encountered by the non-pre-equalized signal;
   after receiving the non-pre-equalized signal, receiving a pre-equalized signal at the upstream receiver;
   identifying pre-equalization coefficients associated with the pre-equalized signal, wherein the pre-equalization coefficients comprise a pre-equalization coefficient associated with a main pre-equalizer tap and one or more pre-equalization coefficients associated with one or more non-main pre-equalizer taps;
   determining a tap equalization ratio for each respective one of the one or more non-main pre-equalizer taps, wherein the tap equalization ratio for each respective non-main pre-equalizer tap is equivalent to the ratio of the pre-equalization coefficient associated with the main pre-equalizer tap to the pre-equalization coefficient associated with the respective non-main pre-equalizer tap;
   comparing the tap equalization ratio associated with each respective one of the one or more non-main pre-equalizer taps to a predetermined threshold; and
   enabling the respective non-main pre-equalizer tap based on the comparison between the tap equalization ratio associated with the respective non-main pre-equalizer tap and the predetermined threshold.

2. The computer-implemented method of claim 1, wherein the extent of upstream channel impairments encountered by the non-pre-equalized signal is determined based upon a ratio of energy measured in a main equalizer tap over energy measured in one or more non-main equalizer taps.

3. The computer-implemented method of claim 2, wherein the number of equalizer taps to be used at the upstream receiver is determined based upon a comparison between the ratio of energy measured in the main equalizer tap over energy measured in the non-main equalizer taps and a predetermined threshold value.

4. The computer-implemented method of claim 1, wherein the upstream receiver is in a cable modem termination system.

5. A system, comprising:
an interface operable to be used to receive upstream signals;
a data store operable to store computer program instructions and provide temporary storage for the system; and
a processor operable to execute said computer program instructions, the computer program instructions being operable to cause the processor to:
identify equalization coefficients associated with a received signal;
determine the extent of upstream impairments in an upstream channel through which the signal was received based upon the identified equalization coefficients; and
determine a number of equalizer taps to use based upon the extent of upstream impairments;
wherein the interface is further operable to be used to, after receiving the non-pre-equalized signal, receive a pre-equalized signal;
wherein the computer program instructions are further operable to cause the processor to:
identify pre-equalization coefficients associated with the pre-equalized signal, wherein the pre-equalization coefficients comprise a pre-equalization coefficient associated with a main pre-equalizer tap and one or more pre-equalization coefficients associated with one or more non-main pre-equalizer taps;
determine a tap equalization ratio for each respective one of the one or more non-main pre-equalizer taps, wherein the tap equalization ratio for each respective non-main pre-equalizer tap is equivalent to the ratio of the pre-equalization coefficient associated with the main pre-equalizer tap to the pre-equalization coefficient associated with the respective non-main pre-equalizer tap;
compare the tap equalization ratio associated with each respective one of the one or more non-main pre-equalizer taps to a predetermined threshold; and
enable the respective non-main pre-equalizer tap based on the comparison between the tap equalization ratio associated with the respective non-main pre-equalizer tap and the predetermined threshold.

6. The system of claim 5, wherein the extent of upstream channel impairments encountered by the signal is determined based upon a ratio of energy measured in a main equalizer tap over energy measured in one or more non-main equalizer taps.

7. The system of claim 5, wherein the extent of degradation of the signal is determined based upon a ratio of energy measured in a main equalizer tap over energy measured in one or more non-main equalizer taps.

8. The system of claim 5, wherein the system is in a cable modem termination system.

9. One or more non-transitory computer readable media operable to execute on one or more processors, the computer readable being operable to cause the one or more processors to perform the operations comprising:
receiving a non-pre-equalized signal at an upstream receiver;
determining the extent of upstream channel impairments encountered by the non-pre-equalized signal;
receiving a pre-equalized signal at the upstream receiver;
determining the extent of degradation of the pre-equalized signal; and
determining a number of equalizer taps to use at the upstream receiver based upon the extent of upstream channel impairments encountered by the non-pre-equalized signal and the extent of degradation of the pre-equalized signal.

10. The one or more non-transitory computer-readable media of claim 9, wherein the extent of upstream channel impairments encountered by the non-pre-equalized signal is determined based upon a ratio of energy measured in a main equalizer tap over energy measured in one or more non-main equalizer taps.

11. The one or more non-transitory computer-readable media of claim 9, wherein the extent of degradation of the pre-equalized signal is determined based upon a ratio of energy measured in a main equalizer tap over energy measured in one or more non-main equalizer taps.

12. The one or more non-transitory computer-readable media of claim 9, wherein the extent of degradation of the pre-equalized signal is determined based upon a measurement of energy in each of one or more non-main equalizer taps.

13. The one or more non-transitory computer-readable media of claim 9, wherein the upstream receiver is in a cable modem termination system.

14. The one or more non-transitory computer-readable media of claim 10, wherein the number of equalizer taps to be used at the upstream receiver is determined based upon a comparison between the ratio of energy measured in the main equalizer tap over energy measured in the one or more non-main equalizer taps and a predetermined threshold value.

15. The one or more non-transitory computer-readable media of claim 11, wherein the number of equalizer taps to be used at the upstream receiver is determined based upon a comparison between the ratio of energy measured in the main equalizer tap over energy measured in the one or more non-main equalizer taps and a predetermined threshold value.

* * * * *